US012257670B2

(12) United States Patent
Buchanan

(10) Patent No.: US 12,257,670 B2
(45) Date of Patent: Mar. 25, 2025

(54) RATCHET WRENCHES

(71) Applicant: Nigel Alexander Buchanan, Fife (GB)

(72) Inventor: Nigel Alexander Buchanan, Fife (GB)

( * ) Notice: Subject to any disclaimer, the term of this patent is extended or adjusted under 35 U.S.C. 154(b) by 0 days.

(21) Appl. No.: 17/275,093

(22) PCT Filed: Sep. 10, 2019

(86) PCT No.: PCT/GB2019/000129

§ 371 (c)(1),
(2) Date: Mar. 10, 2021

(87) PCT Pub. No.: WO2020/053539

PCT Pub. Date: Mar. 19, 2020

(65) Prior Publication Data

US 2022/0048165 A1 Feb. 17, 2022

(30) Foreign Application Priority Data

Sep. 10, 2018 (GB) ..................................... 1814694

(51) Int. Cl.
*B25B 13/46* (2006.01)

(52) U.S. Cl.
CPC ................................. *B25B 13/463* (2013.01)

(58) Field of Classification Search
CPC . B25B 13/463; B25B 13/46381; B25B 13/63; B25B 13/12; B25B 13/46; B25B 13/467; B25B 13/468; B25B 13/48; B25B 13/481; B25B 17/00; B25B 17/02; B25B 23/00; B25B 23/0007; B25B 23/0021; B25B 23/142; B25B 13/04; B25B 13/08
See application file for complete search history.

(56) References Cited

U.S. PATENT DOCUMENTS

| | | | | |
|---|---|---|---|---|
| 6,044,731 A * | 4/2000 | Hsieh | .................... | B25B 13/463 81/63 |
| 6,988,430 B1 * | 1/2006 | Putney | .................. | B25B 13/462 81/60 |
| 9,821,441 B2 * | 11/2017 | Chen | ..................... | B25B 13/463 |

(Continued)

FOREIGN PATENT DOCUMENTS

| | | | | |
|---|---|---|---|---|
| DE | 202012007004 U1 * | 1/2013 | ........... | B25B 13/463 |
| JP | 3156724 U * | 1/2010 | ........... | B25B 13/463 |

(Continued)

*Primary Examiner* — Robert J Scruggs
(74) *Attorney, Agent, or Firm* — Thibault Patent Group

(57) ABSTRACT

The ratchet mechanism comprises a head portion with a circular central housing, the inner surface adjoining the handle portion having a further recess characterized by a plurality of engagement ramp profiles arranged not unlike low angled gear teeth within the recess arc. A pawl is located within the recess, with a corresponding plurality of engagement ramp profiles abutting the recess engagement ramp profiles and incorporating an inner facing toothed face of similar corresponding pitch and profiles as the drive element teeth in order that they can mechanically mesh into one another when ratchet is operated in the drive direction, the pawl inward force being substantially evenly distributed along the pawl toothed front face by the use of several similar engagement ramp profiles urging all the pawl teeth into the required locking engagement with the drive element simultaneously.

18 Claims, 10 Drawing Sheets

(56) References Cited

U.S. PATENT DOCUMENTS

2003/0019335 A1 * 1/2003 Hu ........................ B25B 13/463
81/63.2
2004/0216565 A1 * 11/2004 Chen ..................... B25B 13/463
81/63.2
2015/0352697 A1 * 12/2015 Yang ....................... F16D 41/18
81/63.2

FOREIGN PATENT DOCUMENTS

WO WO 2017077335 * 5/2017
WO WO-2017077335 A1 * 5/2017 ........... B25B 13/462

* cited by examiner

RATCHET WRENCHES

FIELD OF THE INVENTION

The invention relates to ratchet wrenches (often referred to in the United Kingdom as spanners).

BACKGROUND TO THE INVENTION

Ratchet wrenches may comprise a wrench head that houses a driven member. The driven member may be provided with an aperture shaped to receive an item that is to be driven. For example, the aperture may be a hexagonal aperture sized to receive a particular size of fastener head/nut. Alternatively, the driven member may comprise a spigot that projects from the wrench head to allow the wrench head to be connected to a drive socket or the like. The driven member may have a circumferentially extending surface provided with a series of teeth that are engageable by the teeth of a pawl that is located within a recess within the wrench head. The leading edge of the pawl is generally wedge shaped, as is the ends of the recess that the pawl is situated in. The engagement between the pawl and teeth is such that if the wrench head is turned in a first direction, the rotation of the wrench head is transmitted to the driven member in a locking manner as the pawl is driven into engagement with a ramp surface in the pawl recess. If the wrench head is turned in a second (opposite) direction, the pawl slides over the teeth on the driven member against a spring that is used to urge the pawl against the driven member teeth. The wrench head may have multiple pawls.

By this means the wrench can apply a torque to an item by turning the wrench head in the first direction and the wrench handle can be repositioned with respect to the item by turning the wrench head in the second direction. Wrenches of this type may be provided with a pair of pawls or a pawl with ramps at either ends, the pawl being selectively engageable with the driven member by means of a switch. The torque applying and handle repositioning directions of the wrench can be reversed by operation of the switch.

The majority of current prior art switchable wrench ratchets incorporate a central drive element portion having a circular toothed circumference which engages a corresponding toothed pawl which is appropriately spring biased in the chosen direction by a switch against two appropriately angled wedge ramp faces formed in the ratchet head housing against which the wedge-shaped pawl can be resiliently urged. The switch shaft further incorporates a bore containing a spring and plunger, the plunger is in contact with the back of the pawl opposite its front engagement teeth. The plunger, pawl contact area is formed into an arced cam with end walls such that the rotation of the switch with its incumbent spring and plunger urges the plunger against the end wall from one end wall to the other resiliently projecting the particular pawl wedge shaped outer contact portion against the required housing wedge shaped ramp portion in order to provide a suitable locking function when the ratchet is utilized in the chosen drive direction as the wedging of the pawl usefully urges the pawl teeth against the teeth of the drive portion effectively locking the drive portion within the housing. In the chosen reverse or reposition direction the housing wedge shaped ramp is caused to separate from the pawl wedge shaped ramp by the drive element teeth acting upon the pawl teeth, the switch spring and plunger resiliently urging the pawl teeth against the drive portion teeth, the typical ratchet clicking noise is caused by the corresponding teeth disengaging and engaging as they travel over one another in the reverse direction. In the drive direction the pawl as it is projected against its corresponding housing wedge shaped ramp, however the pawl teeth only truly robustly engage at or near the actual wedge shaped end contact areas, hereinafter termed engagement ramps, equivalent to approximately 40 deg. or less of the drive element teeth, the normal point of failure of most ratchets is due to over torque usage, wear or fouling of the ratchet pawl teeth, the more or larger the teeth completely engaged the less the wear or over torque problem. As correctly illustrated in FIG. 4 U.S. Pat. No. 9,545,705 Hu when a bi-directional pawl is utilized less than half of the pawl teeth completely engage the analogous drive element teeth, furthermore this is also a similar characteristic of single direction ratchets, if the pawl and housing recess engagement ramp angles were to be modified in order to substantially improve the teeth engagement, the pawl would tend to problematically jam against the pawl recess engagement ramp, empirical testing over many years having led to this compromise. The current useable lifecycle of such a ratchet using a prior art pawl is two years in a busy professional automotive workshop environment, the pawl and its spring being classed as a consumable item.

Prior art ratchet wrenches cannot always be utilized in confined spaces because of their required depth or widths preventing sufficient access. WO2017/077335, WO 2017/077325 Buchanan illustrate a switchable direction ratchet mechanism utilizing a pseudo-laminate like construction, a deformable partly toothed clutch ring forming the mid-part of a construction comprising an outer housing and a drive element. This resultant laminate like construction of the drive element, clutch and housing enables an inherently strong reduced depth or alternatively a slightly reduced width ratchet but not both. The clutch ring encompassing the drive element in the drive sequence being propelled inwards upon the drive element by the clutch abutment angles in that particular direction acting upon the corresponding housing ramp contact angles, therefore forcefully constricting the said clutch ring, upon the drive element in a locking manner. The compression and locking force increasing according to the torque applied to the handle portion, the housing inner surface being in equal contact force with the majority of the said clutch outer surface and the said clutch inner surface in equal contact force with the majority of the drive outer surface, thereby substantially distributing the inward and outward forces in a laminate like manner within the housing during use. WO2017/077322 (Buchanan) discloses a similar ratchet mechanism, albeit a single direction one. This design allows a slim ratchet head width, but with a conventional depth.

FIG. 11 shows a quality prior art ratchet wrench. The teeth 421 of the pawl 42 are engaged with corresponding teeth 32 of a driven member 30. It can be seen that the pawl teeth 421 typically only fully engage with the facing teeth 32 of the driven member 30 at and near the leading edge of the said pawl 42.

It is an object of the present invention to at least partially alleviate the above-mentioned disadvantages, or to provide an alternative to existing products.

SUMMARY OF THE INVENTION

The invention provides a ratchet wrench as specified in claims 1 to 18

Embodiments of the invention may provide a slimmer profiled ratchet wrench than any other currently available on the market, whilst attaining or exceeding the current torque standards. They may also allow the manufacturers to produce more cost effective and reliable products.

The invention also includes a ratchet wrench comprising a driven member. A housing having an aperture in which said driven member is received, an elongate handle or operating member having a hand grip end and a levered head portion end. The head portion having a generally centrally disposed circular housing, the inner surface of which adjoining the handle portion is provided with a recess comprising a plurality of engagement ramp surface arranged not unlike low angled teeth within the recess arc. A pawl is located within the recess, the pawl has corresponding engagement ramp profiles abutting ramp surfaces and an inner facing toothed face of similar corresponding pitch and profiles as the drive element teeth in order that they can mechanically mesh into one another when operated in the drive direction. The rear pawl face incorporates a flange capable of side movement within a suitable corresponding undercut adjacent said recess for the containment of the pawl flange and the recess undercut further comprising a suitable connection between the switch plunger and the pawl flange biasing profile. The pawl flange biasing profile further incorporates two opposite end stops with a guide face between them. Optionally there is provided a direction biasing switch which may be similar to that in the prior art switch, the switch axle capable of rotation within the head portion switch bore, the switch axle having a further blind cavity cross bore for the sliding fit of the further plunger cylinder and its outwardly biasing plunger spring, the switch being rotatable within an arc allowing the said sprung plunger to be switched as required between the said two pawl end stops in order to bias in the required direction the pawl engagement ramp profiles against the respective ramp surfaces in order to provide clock or anti-clockwise drive directions.

The first embodiment may comprise a head portion comprising a generally circular drive element housing, the inner surface of which adjoining the handle portion having a further recess provided with a plurality of ramp surfaces arranged not unlike low angled gear teeth within the recess arc. A pawl is located within the recess, the pawl having a corresponding plurality of engagement ramp profiles abutting the ramp surfaces and incorporating an inner facing toothed face of similar corresponding pitch and profiles as the drive element teeth in order that they can mechanically mesh into one another when required, the pawl inward force being substantially evenly distributed along the pawl toothed front face by the use of the several similar engagement ramp profiles urging the pawl into the required locking engagement simultaneously. This arrangement usefully allows a superior number of pawl teeth to be capable of full engagement with the drive element teeth during the drive sequence yet with the correct angles chosen and effortless disengagement from the pawl engagement ramp profiles from the ramp surfaces in the reverse or reposition direction. The pawl engagement ramp profiles have a suitable gap from the ramp surfaces during the reverse or reposition action to allow the pawl teeth to adequately disengage from the drive element teeth.

A second embodiment may have corresponding engagement ramp profiles may be arranged not unlike low angled teeth or mirrored in profile in order that the ratchet action can be utilized in both the clockwise or anticlockwise direction.

A third embodiment may have engagement ramp profiles that are single toothed or shark fin like profiled in order that the ratchet action can be utilized in only one direction whereas no switch function is required.

A fourth embodiment may have a portion of the head portion housing wall width that can be usefully reduced, in order to provide a useful resiliently deformable wall portion. When the reduced profile ratchet is operated in the drive direction the pawl engagement ramp profiles are projected against the pawl recess engagement profiles further robustly projecting the pawl toothed face inwardly against the annular drive element toothed portion locking the said drive element within the head portion. The present drive element is further designed to be capable of limited lateral movement against the housing inner surface, whereas the drive element toothed portion can robustly contact the said housing inner surface opposing the pawl recess, according to the force applied to levering end of the handle by the operator, the said drive element contact according to the said operator drive force applied usefully deforming the said head portion resiliently deformable wall portion inwardly upon the drive element toothed portion resulting in a further superior clamping force area between the said drive element toothed portion and the opposing housing wall. The drive element may have flat topped teeth as an aid to the further useful locking action so provided between the drive element and the housing inner surface.

A fifth embodiment may have a pawl toothed face circumference angle truly available to effectively and robustly mesh with the drive element toothed circumference is enhanced by the use of the said pawl having a plurality of engagement ramp profiles abutting the correspondingly similar recess engagement ramp profiles. Whereby the true said pawl to said drive element toothed engagement can be substantially improved over that in the prior art from at best 40 deg. to 50-80 deg. As the pawl teeth are the major wear or torque failure problem in prior art ratchet wrenches or socket drives this is a most important improvement to the art as it is a major contribution to reducing manufacturing, servicing and warranty costs.

Furthermore, the thickness of the pawl toothed front face to that of its pawl rear face can be further usefully reduced as the pawl is now usefully urged into locking engagement in the drive direction when required by a plurality of engagement ramps over its length instead of singly in the drive direction as in the prior art.

A sixth embodiment may be capable of a usefully low height profile in order to perform in restricted areas unavailable to prior art ratchets. The drive element toothed portion within the housing is substantially the same height as the head portion housing wall. The corresponding pawl toothed front face depth is also is substantially the same height as the head portion housing wall, thereby maximising the pawl to drive element tooth to pawl tooth engagement contact area. The toothed drive element being further located between two thin washer-like flanges, the washer like flanges retain the drive element within the head portion housing whilst usefully allowing the drive element to rotate as required and move latterly according to the tolerances given. A further aid to locking engagement being the tops of the drive element teeth are preferably radiused or near flat topped, the “flat top” being substantially the same circumferential profile as the housing inner sidewall. Furthermore, if the outer radiuses of the drive element teeth have minimal radii, their locking engagement with the smooth housing inner sidewall will be measurably enhanced. This embodiment allows the operation of the present invention in situations unavailable to other prior art production ratchets, whilst still passing the relevant torque standards.

A seventh embodiment may have a usefully reduced width profile in order to perform in restricted areas unavailable to prior art ratchets. As the drive element is no longer held and rotated using axle portions between conventional housing plain bearing surfaces and the drive element is no longer secured by the use of clips within housing grooves there is less of a requirement for a thick housing wall. For example, a high-quality thin profile conventional ⅜" ratchet will have a wall thickness of between four to six millimetres, whereas the present invention can have a wall thickness of two millimetres whilst achieving similar torque ratings. This embodiment allows the operation of the ratchet wrench in situations unavailable to other prior art production ratchets, whilst still passing the relevant torque standards.

In an eighth embodiment the toothed drive element may be situated between two washer-like flanges. The washer like flanges retain the drive element within the head portion housing whilst allowing rotation as required within the housing. Preferably the drive element retaining flange can be incorporated within the drive element which is preferably made by high pressure moulding HPM or metal injection moulding MIM in order to further reduce the production cost. This process allows the parts to be mass produced in great numbers with great precision, the drive teeth can easily be over 120 in number whilst the profiles of the teeth remain accurate. The closure washer can be stamped and usefully further achieve the enclosure of the drive portion by the use of screws which can also be conveniently removed in order to usefully access or service the internal ratchet mechanism.

In a ninth embodiment the ratchet mechanism can be completely sealed in order to prevent harmful moisture or detritus ingress. The toothed drive element being located between two washer-like flanges, the washer like flanges retain the drive element within the head portion housing whilst usefully allowing the drive element to rotate as required or move latterly according to the tolerances given. The inner surface of the flange or washer lips can further usefully incorporate a groove near their periphery, in which an appropriate seal can be located, the seals usefully acting against the upper and lower smooth flat housing faces outwardly of the pawl recess, in order to provide an efficient method of preventing detritus or moisture damaging the ratchet mechanism. A further groove and seal can be located within the circular shaft of the switch in order to advantageously complete the sealing action when a switch is fitted.

A tenth embodiment may be configured as a un-switched or single direction ratchet the pawl can be resiliently urged into engagement by a low cost torsion type spring positionally retained by a suitable pin through the spring loop, one end of the said spring resiliently acting against the undercut sidewall, the opposing end of the said spring usefully resiliently acting against the pawl rear protrusion.

In an eleventh embodiment, the size and shape of the ramp surfaces and corresponding pawl engagement ramp profiles are chosen to ensure that they cannot completely disengage from one another when the ratchet is used in the reverse direction.

In a twelfth embodiment, under applied torque situations causes the drive element, pawl and head portion housing wall to take the form of a partly pseudo laminate construction when utilized in the said drive direction. This structure provides the method whereby there is achieved an inherently stronger mechanism size for size compared to the prior art, thus permitting superior torque or useful head size reduction. Laminates being inherently stronger than similar thickness materials when using metal grain structures in dissimilar grain directions (cross grain), the resultant compression forces applied to the drive element are substantially dissipated around its circumference. The resultant part pseudo laminate like construction of the drive element, pawl and housing enables a proportionately far stronger or a thinner lighter device. Furthermore, the head portion strength is enhanced by the fact that the main locking forces are directed inwards upon the inherently strong circular drive element surface.

In a thirteenth embodiment, the drive element closure washer and optionally the retaining flange are secured against one another by rivet upstands incorporated within the drive element mating surface, the closure washer having a countersunk hole for the retention of the rivet head profile. By incorporating the rivet fixing within the drive element mating face and thereby virtually obviating the chance of a separate rivet or screw coming loose from the drive element the device is ideal for use in the aerospace industry as the incidence of foreign objects being left in problem areas is further reduced. The rivet protrusions could be further usefully enhanced by the use of central countersunk holes for the ease of precision splaying during the production process.

In a fourteenth embodiment, either the closure washer or retaining flange can usefully incorporate a thumbwheel profile for the convenient and speedy rotation of the drive element by the operator.

At rest the pawl toothed portion may be biased into the corresponding drive element teeth by the switch or torsion spring in order to provide as far as possible instantaneous engagement between the drive element and pawl teeth in such a way to be meshed in circumferential unison when utilized in the ratchet drive direction.

The present invention even further comprises a ratchet mechanism wherein the head portion housing depth for a ¼ inch square drive is less than 7 mm., whilst still passing the relevant torque standards.

The present invention even further comprises a ratchet mechanism wherein the head portion housing depth for a ¼ inch square drive is less than 6 mm., whilst still passing the relevant torque standards.

The present invention even further comprises a ratchet mechanism wherein the head portion housing depth for a ¼ inch square drive is less than 5 mm., whilst still passing the relevant torque standards.

The present invention even further comprises a ratchet mechanism wherein the head portion housing depth for a ⅜ inch square drive is less than 8 mm., whilst still passing the relevant torque standards.

The present invention even further comprises a ratchet mechanism wherein the head portion housing depth for a ⅜ inch square drive is less than 7 mm., whilst still passing the relevant torque standards.

The present invention even further comprises a ratchet mechanism wherein the head portion housing depth for a ½ inch square drive is less than 12 mm., whilst still passing the relevant torque standards.

The present invention even further comprises a ratchet mechanism wherein the head portion housing depth for a ½ inch square drive is less than 11 mm., whilst still passing the relevant torque standards.

The present invention even further comprises a ratchet mechanism wherein the head portion housing depth for a ½ inch square drive is less than 10 mm whilst still passing the relevant torque standards.

REFERENCE TO THE DRAWINGS

Following is a listing of the various components used in the best mode preferred embodiment and alternative embodiments. For the ready reference of the reader the reference numerals have been arranged in ascending numerical order.

| | |
|---|---|
| 1/ | Ratchet Mechanism |
| 200/ | Drive Element |
| 201/ | Drive Element Toothed Portion |
| 202/ | Drive Element Teeth |
| 203/ | Drive Element Spigot |
| 204/ | Drive Element Fastener Operating Profile |
| 205/ | Drive Element Retaining Flange |
| 206/ | Drive Element Sealing Ring Groove |
| 207/ | Drive Element Seal |
| 208/ | Drive Element Closure Washer |
| 209/ | Drive Element Closure Washer Seal Groove |
| 210/ | Drive Element Thumbwheel Profile |
| 211/ | Drive Element Tooth Tip |
| 212/ | Drive Element Rivet Protrusions |
| 213/ | Drive Element Rivet Centre Holes |
| 214/ | Drive Element Retaining Screws |
| 215/ | Drive Element Screw holes |
| 300/ | Head Portion |
| 301/ | Head Portion Outer Surface |
| 302/ | Head Portion Housing Wall |
| 303/ | Inner Surface of Drive Element Housing |
| 304/ | Housing Flat Face |
| 305/ | Housing Resiliently Deformable Wall Portion |
| 306/ | Housing Pawl Recess |
| 307/ | Ramp Surfaces |
| 308/ | Housing Pawl Recess Single Direction Ramp Profiles |
| 309/ | Recess |
| 310/ | Switch Bore |
| 311/ | Switch Lever Recess |
| 312/ | Drive Element Housing |
| 400/ | Handle |
| 401/ | Hand Grip End |
| 402/ | Head End |
| 500/ | Pawl |
| 501/ | Pawl Toothed Front Face |
| 502/ | Pawl Teeth |
| 503/ | Pawl Dual Direction Engagement Ramp Profiles |
| 504/ | Pawl Rear Face |
| 505/ | Flange |
| 506/ | Pawl Biasing Face |
| 507/ | Pawl Biasing Face First End Stop |
| 508/ | Pawl Biasing Face Second End Stop |
| 509/ | Pawl Biasing Guide Face |
| 510/ | Single Direction Pawl |
| 511/ | Single Direction Pawl Engagement Ramp Profiles |
| 512/ | Single Direction Pawl Rear Face |
| 513/ | Single Direction Pawl Rear Flange |
| 514/ | Single Direction Pawl Biasing Face |
| 515/ | Single Direction Pawl Torsion Spring |
| 516/ | Spring retaining pin |
| 600/ | Direction Setting Switch |
| 601/ | Switch Operating Lever |
| 602/ | Switch Axle |
| 603/ | Switch Axle Cross Bore |
| 604/ | Switch Pressing Member |
| 605/ | Switch Pressing Member Shaft |
| 606/ | Switch Pressing Member Operating Face |
| 607/ | Biasing Spring |
| 608/ | Switch Groove |
| 609/ | Switch Seal |
| D/ | Drive Direction |
| R/ | Reverse Direction |
| PE/ | Pawl Engagement |
| PD/ | Pawl Disengagement |

-continued

| | |
|---|---|
| IF/ | Inward Force |
| OF/ | Outward Force |
| CF/ | Clamping Force |

BRIEF DESCRIPTION OF THE DRAWINGS

In order that the invention may be well understood, some embodiment thereof, which are given by way of example only, will now be described with reference to the drawing in which:

FIG. 1 is a perspective view of the ratchet wrench having a switch and a drive element having a spigot for connection with known sockets and the like:

DETAILED DESCRIPTION

Figure 1:
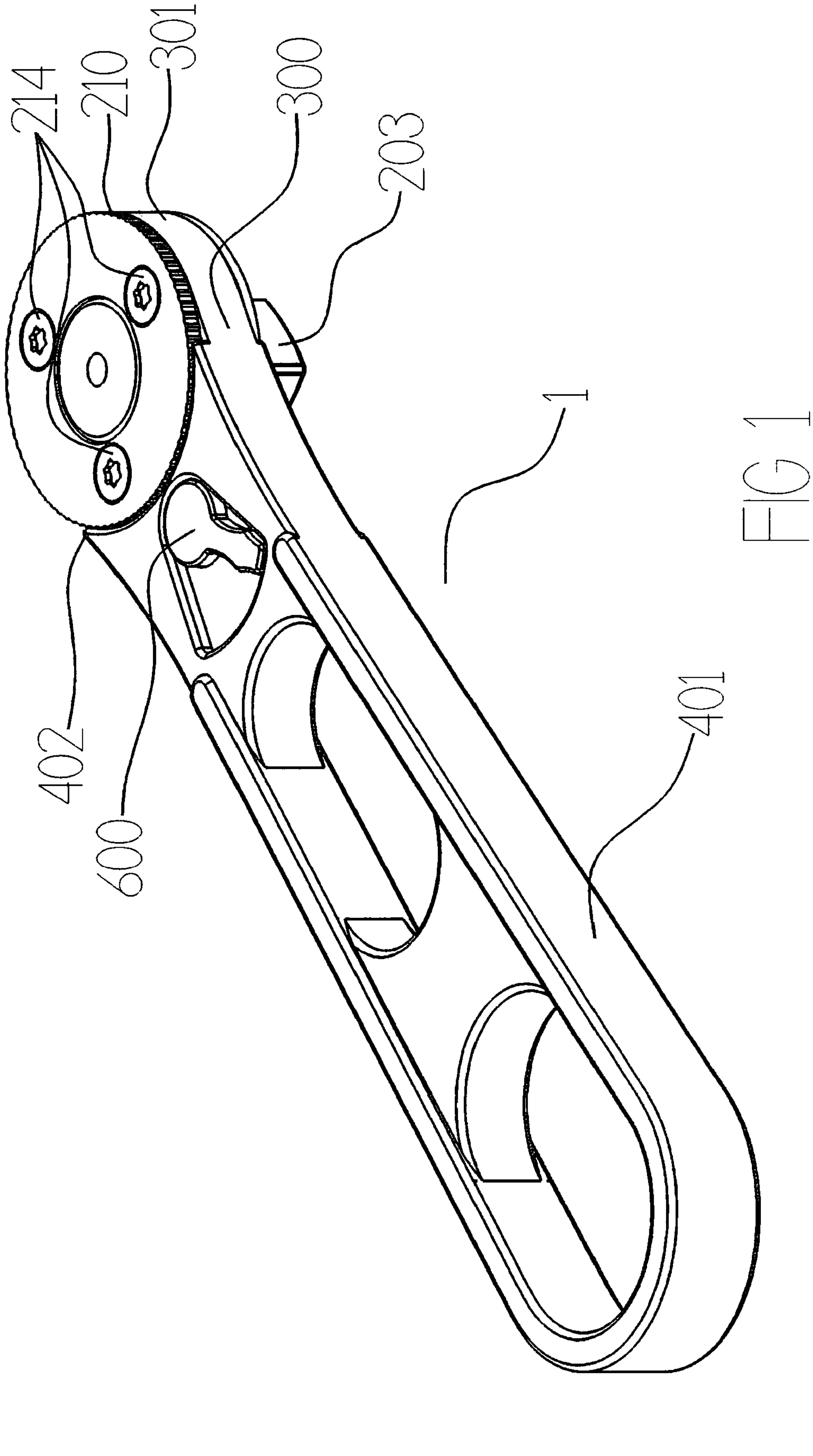

There follows a description of embodiments of the invention. It is to be understood that the disclosed embodiments are merely examples of the implementation of the invention, which may be embodied in various other forms. The figures are not necessarily to scale, as some features may be exaggerated to show details of particular components. Therefore, specific structural and functional details disclosed herein are to aid understanding of the invention and not interpreted as being limiting.

FIGS. 1-10 illustrate the embodiments of a ratchet wrench 1 comprising a head portion 300 having a generally circular drive element housing 312 in which a drive element 200 is at least partially received, an elongate handle 400 having a hand grip end 401 and a head end 402. A pawl recess 306 extends from the inner surface 303 of drive element housing 312 towards the head end 402 of the handle 400. The pawl recess 306 is provided with a plurality of ramp surfaces 307 configured as low angled teeth. A pawl 500 is located within the pawl recess 306.

The pawl 500 is provided with a plurality of engagement ramp profiles 503 abutting the ramp surfaces 307. The pawl 500 has a toothed face 501 facing into the drive element housing 312. The teeth 502 of the toothed face 501 are configured to mesh with drive element teeth 202 of a circumferentially extending toothed portion 201 of the drive element 200 so that the toothed face 501 can transmit a torque input via the handle 400 to the drive element when a turning force in the drive direction D is applied by a user. The rear face 504 of the pawl is provided with a flange 505 disposed within a recess 309. The recess 309 opens into the pawl recess 306 and is disposed between the pawl recess and the head end 402. The flange 505 defines a biasing face 506 that comprises two end stops 507, 508 disposed at opposite ends of the biasing flange and a guide face 509 disposed between the end stops.

Figure 2:
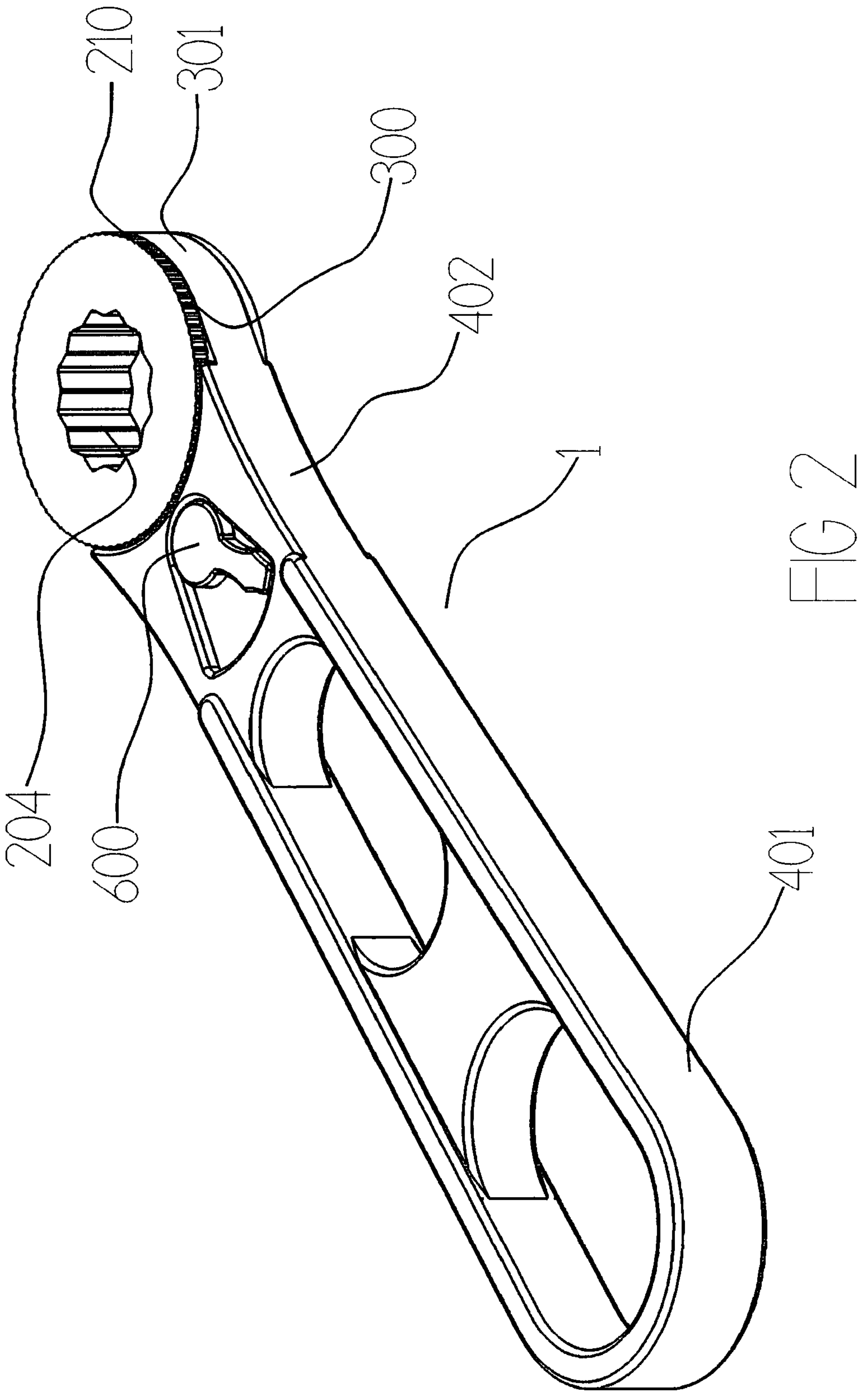
FIG. 2 is a perspective view of a ratchet wrench having a switch and a fastener receiving drive element.

FIGS. 1 and 2 illustrate two versions of a ratchet wrench 1 having the same ratchet mechanism. The example shown in FIG. 1 has a drive element 200 with a spigot 203 and the example shown in FIG. 2 has a drive element 200 with a fastener operating profile 204 configured to receive and engage a fastener.

Optionally a direction setting switch 600 is provided. The switch 600 comprises an operating lever 601 which may be similar to operating levers of prior art switches and a switch axle 602 disposed for rotation within a switch bore 310 provided in the head portion 300. The switch axle 602 is provided with a blind cross bore 603 that houses a pressing member 604 and a biasing spring 607 that biases the pressing member outwardly with respect to the open end of the cross bore 603. The pressing member 604 is a sliding fit in the cross bore 603. The pressing member 604 comprises a shaft 605 disposed within the spring 607 and an operating face 606 disposed externally of the cross bore 603. The operating lever 601 of the switch 600 is disposed within a switch lever recess 311 defined in the head portion 300. The switch lever 601 is rotatable back and forth in the switch lever recess 311 to move the pressing member 604 between the end stops 507, 508 in order to bias the engagement ramp profiles 503 of the pawl 500 against the ramp surfaces 307 in the pawl recess 306 in order to set a clock or anti-clockwise drive direction D. The pawl 500 is resiliently urged into pawl engagement PE with the drive element 200 by the biasing spring 607 and pressing member 604 resiliently acting against the pawl biasing face 506.

Figure 9:
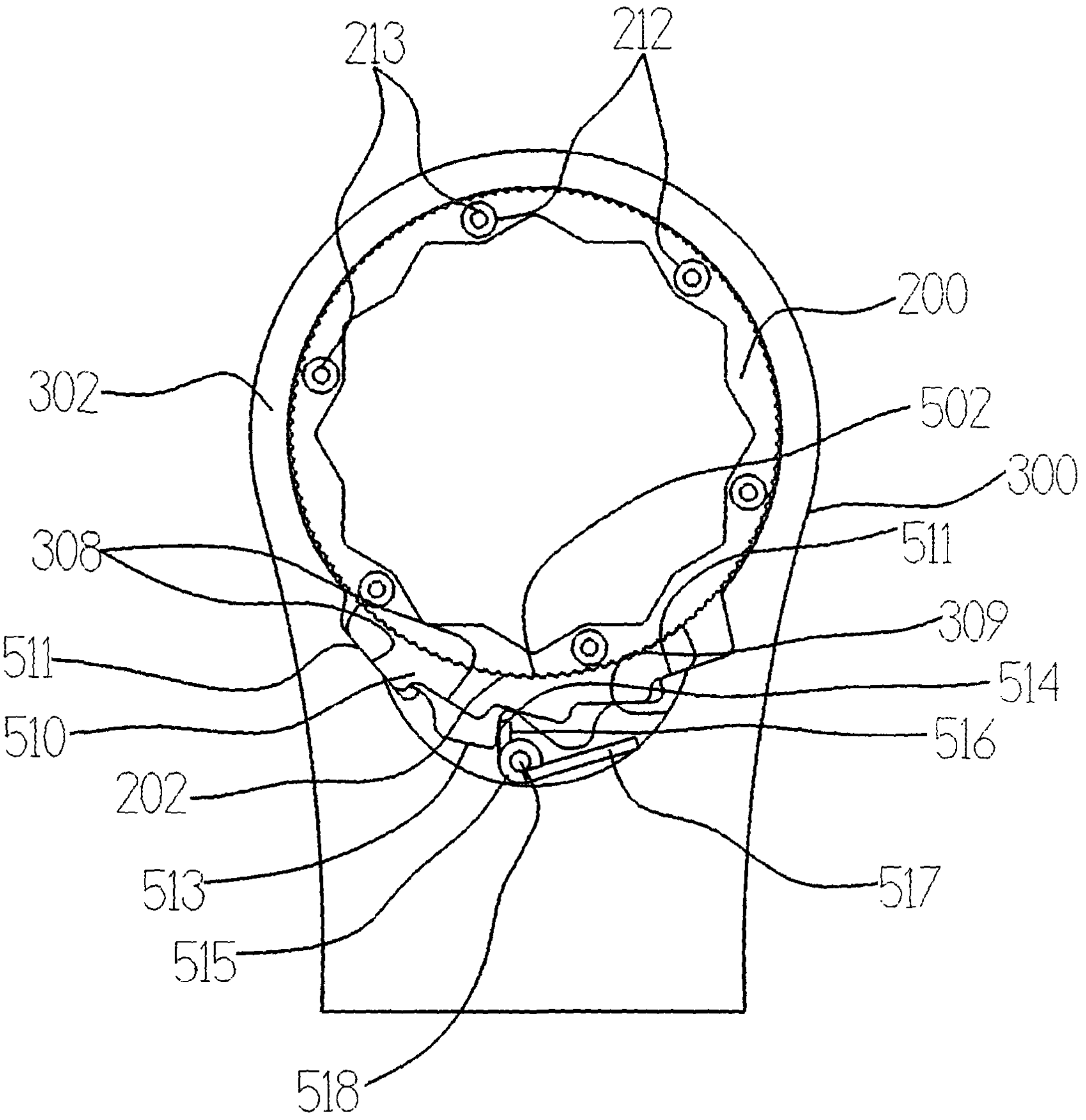
FIG. 9 is a top view of a single direction ratchet wrench with the closure washer removed to reveal the ratchet mechanism.
Figure 10:
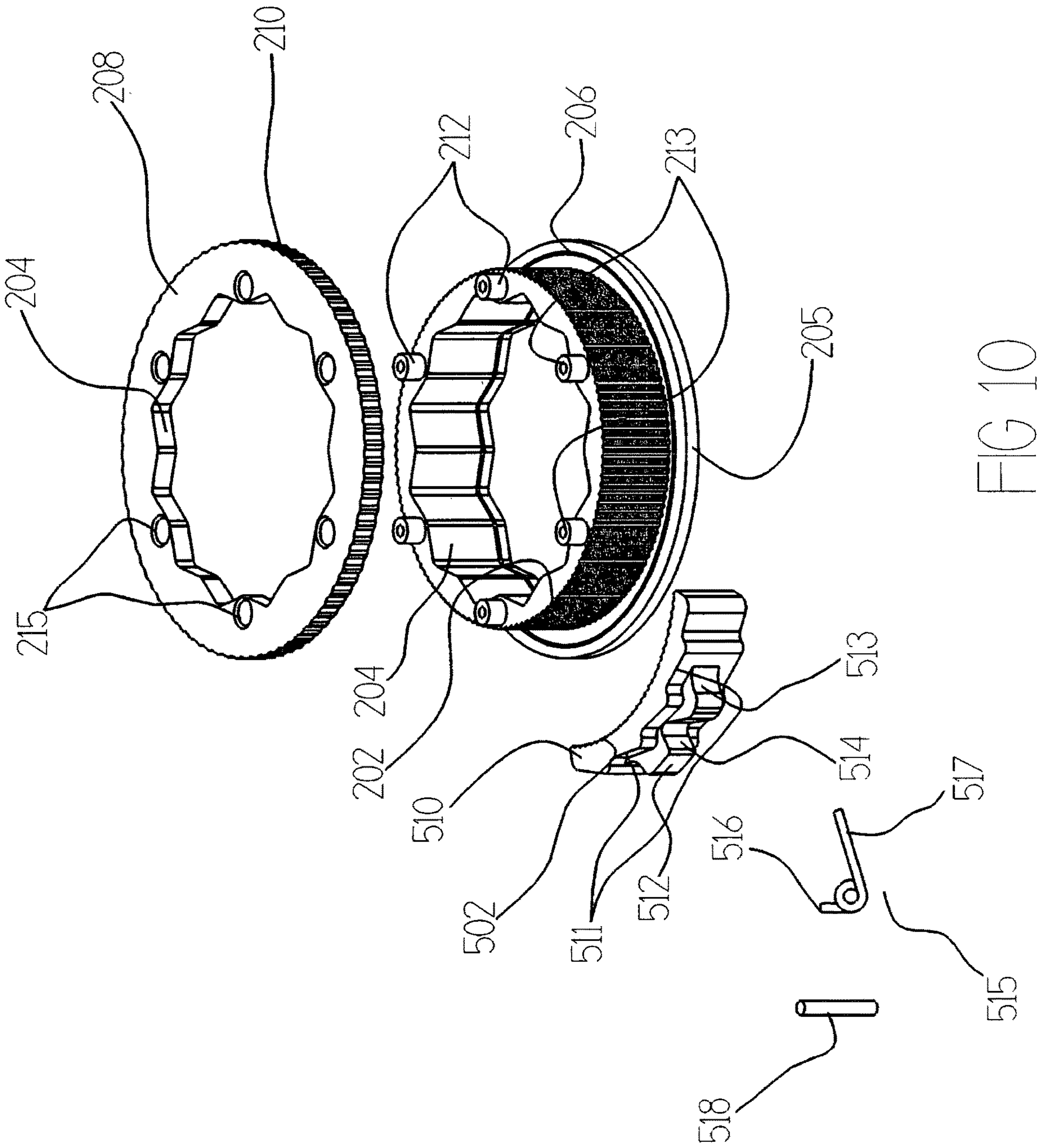
FIG. 10 is an exploded perspective view of the drive element, closure washer, single direction pawl and spring.
Figure 11:
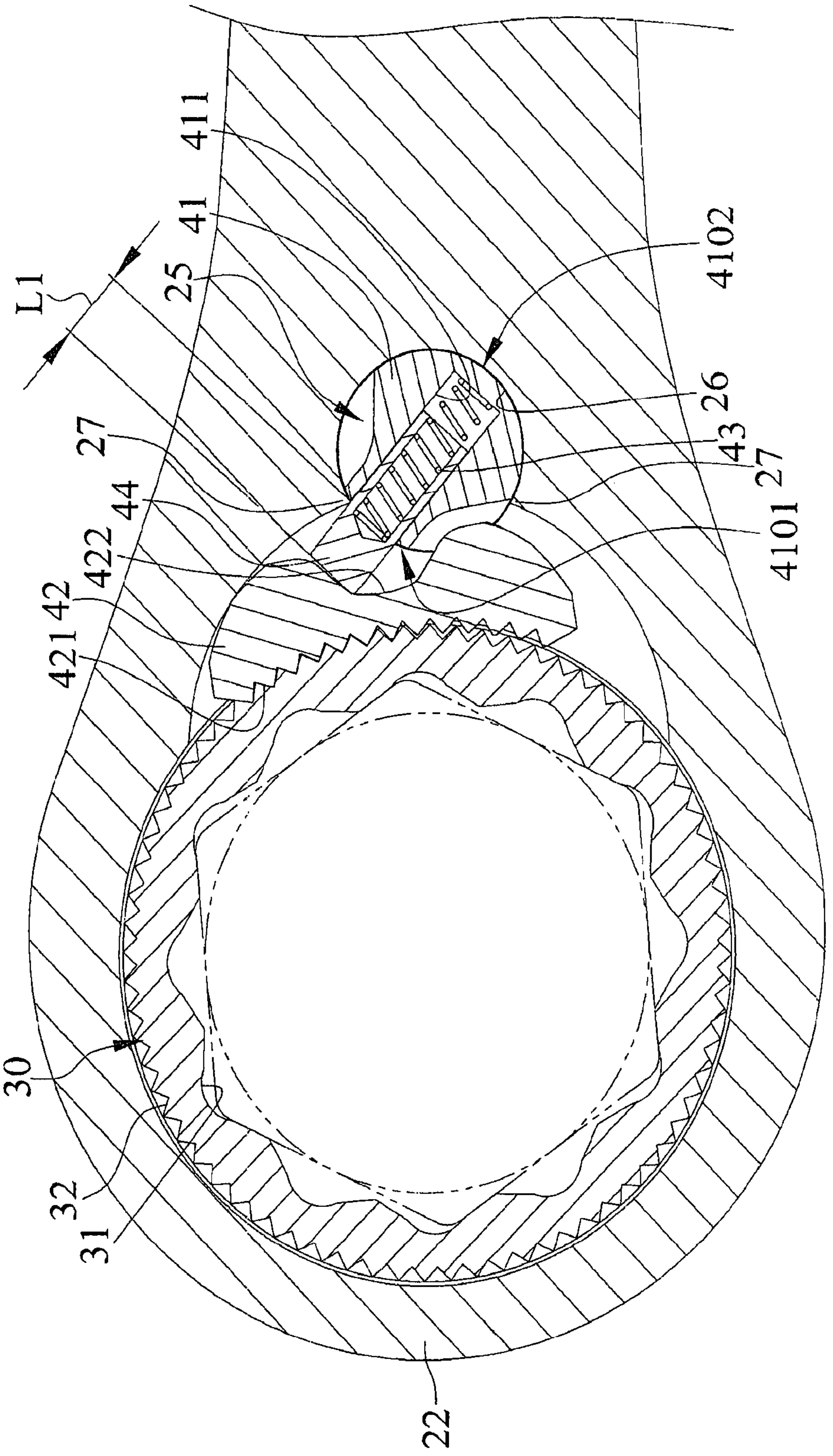
FIG 11 (Prior Art)
FIG. 11 is a cross-sectional plan view of a prior art ratchet wrench.

In the reverse, or reposition, direction R, the pawl 500 is propelled in the pawl disengagement direction PD so that the drive element teeth 202 can slide over the pawl teeth 502 against the biasing force of the switch spring 607. As shown in FIGS. 9 and 10, when the ratchet mechanism is configured as an un-switched, or single direction, mechanism, the pawl 510 may be resiliently urged into engagement PE with the drive element teeth 202 by a low-cost torsion type spring 515 positionally retained by a suitable pin 516. One end 517 of the spring 515 acts against the undercut sidewall of the recess 309 and the opposing end 518 acts against a biasing face 514 of a rearwardly facing flange 513 of the pawl. In the reverse, or reposition, direction R, the pawl 510 is propelled in the pawl disengagement direction PD allowing the drive element teeth 202 to slide over the teeth 502 of the pawl 510 against the biasing force of the torsion spring 515.

Figure 3:
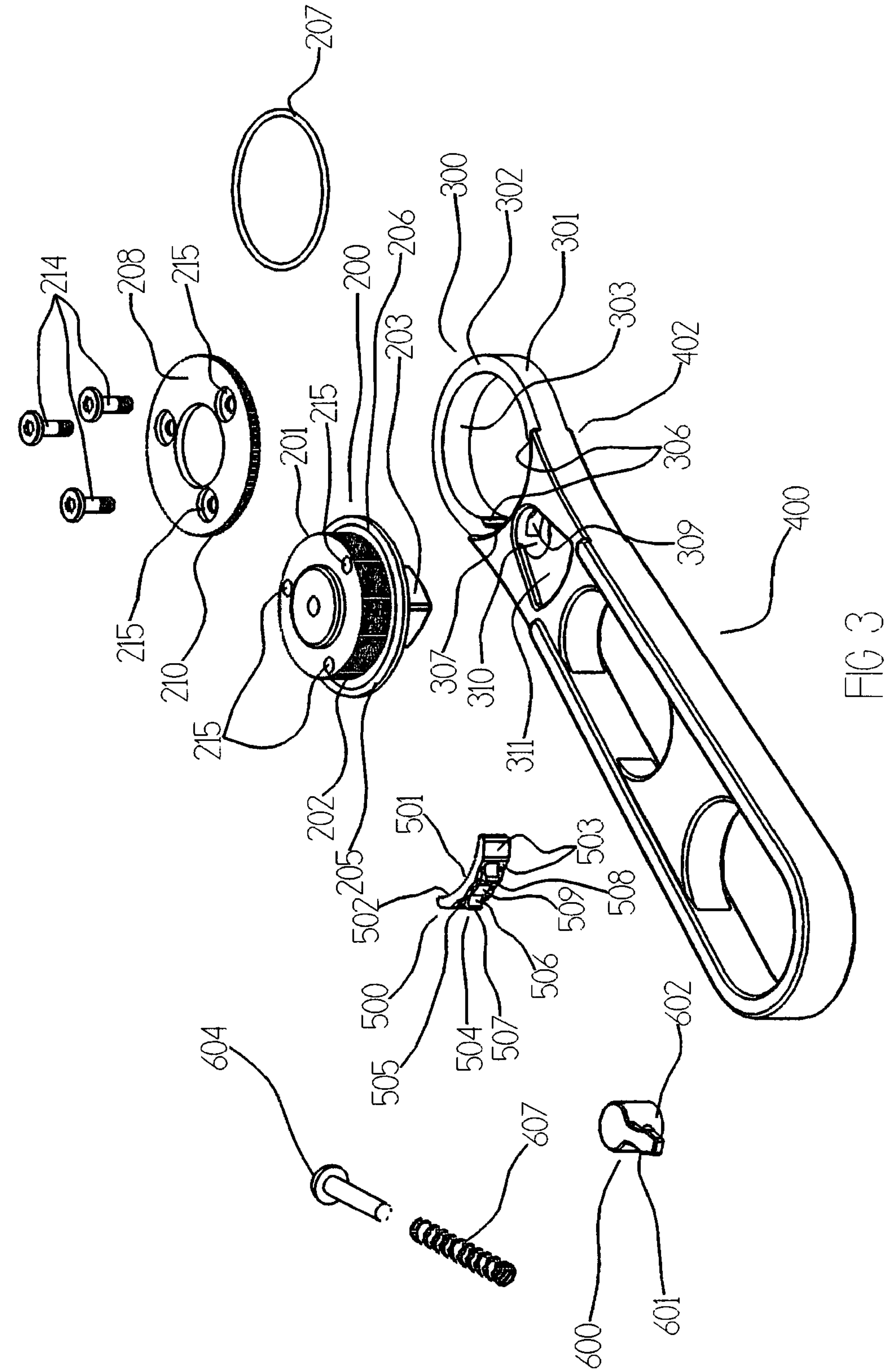
FIG. 3 is an exploded perspective view of the ratchet wrench shown in FIG. 1.
Figure 4:
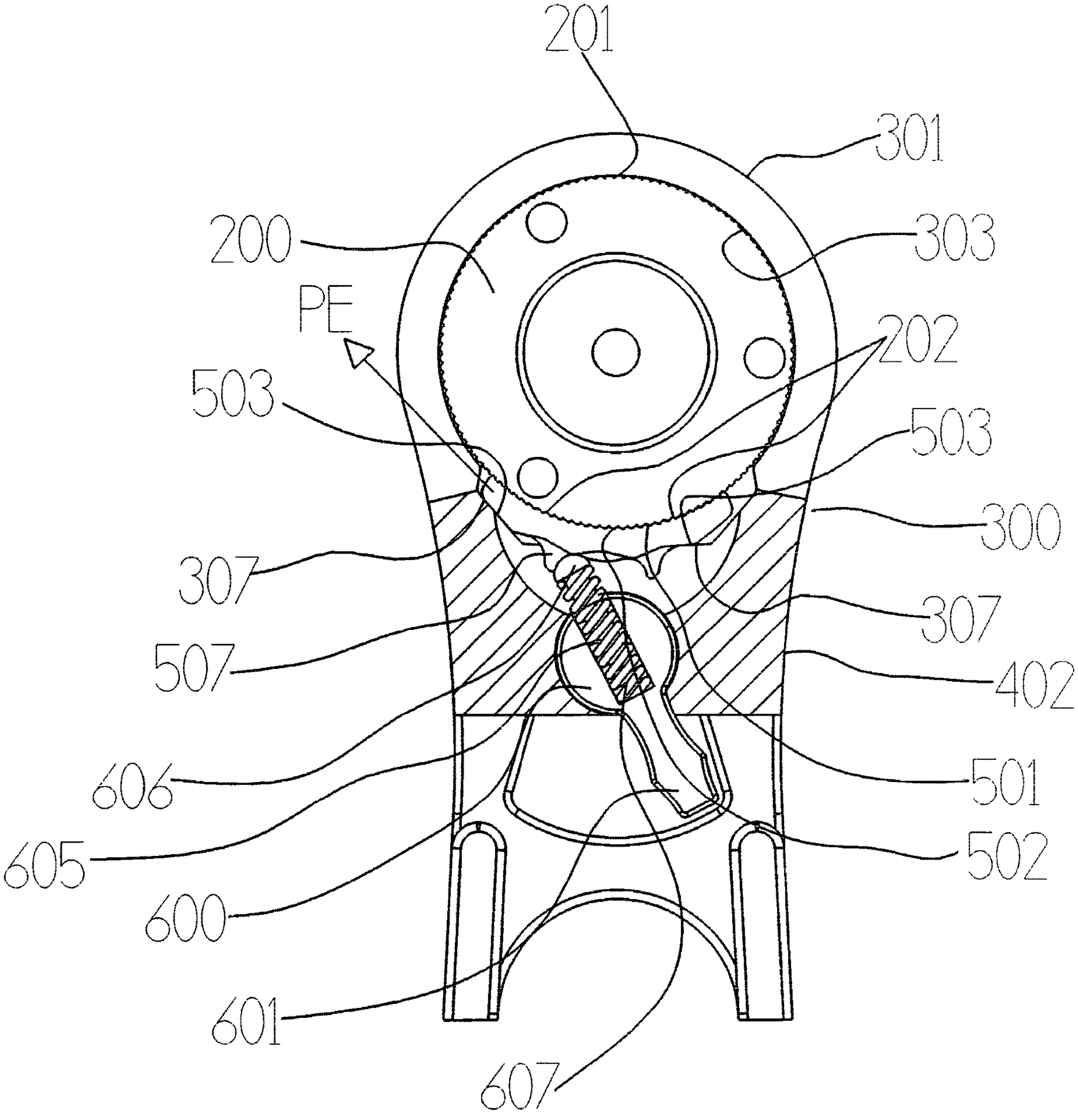
FIG. 4 is a top view of the ratchet wrench of FIG. 1 with the closure washer removed and a part of the handle shown in section.
Figure 5:
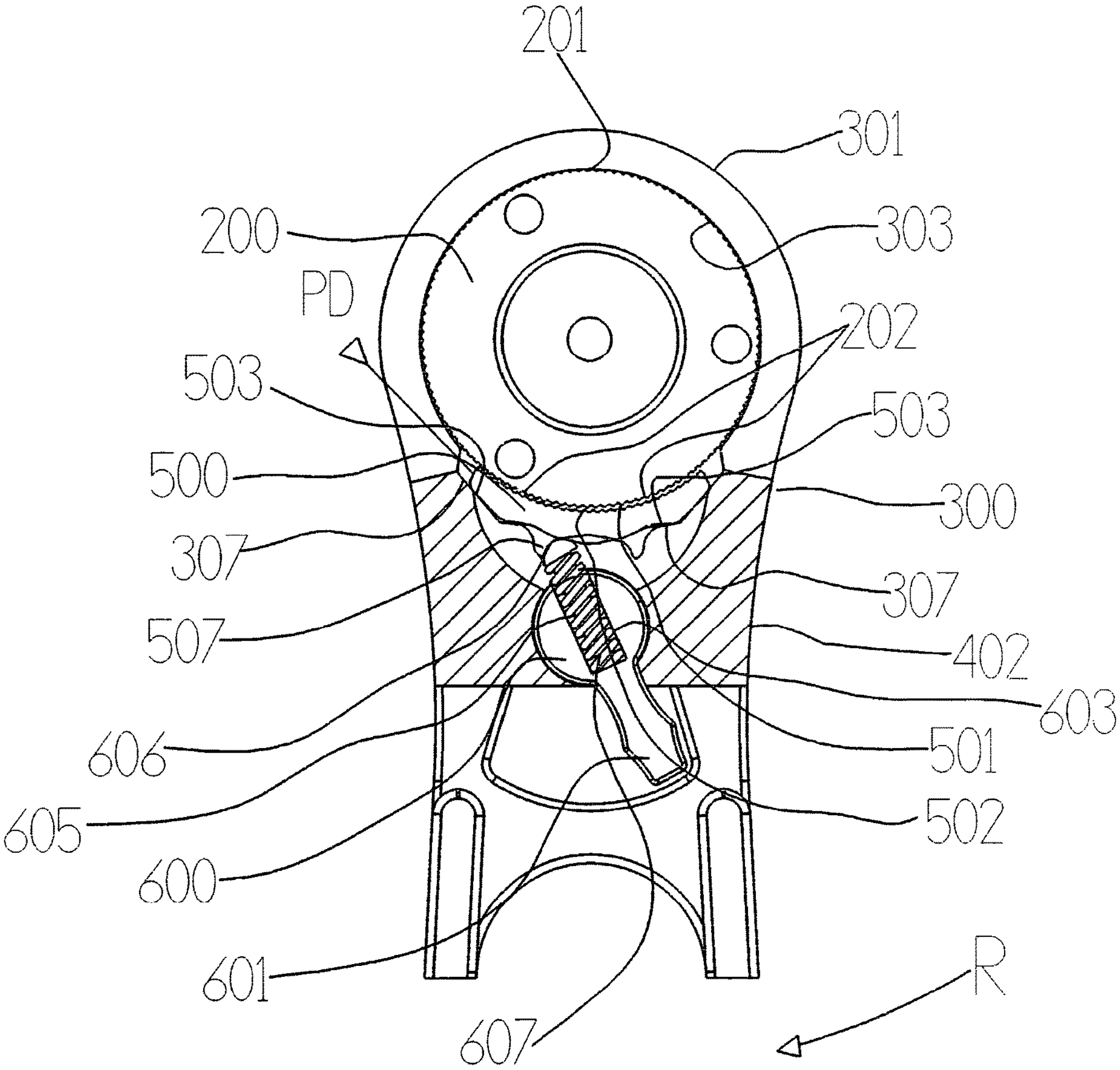
FIG. 5 is a view corresponding to FIG. 4 showing the ratchet wrench operated in the reverse direction.
Figure 7:
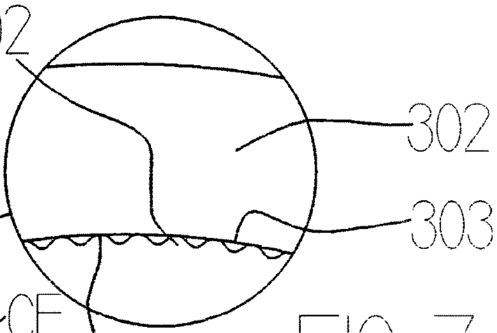
FIG. 7 is a close-up view of the circled portion of FIG. 6.

FIG. 3 is an exploded perspective view of the ratchet wrench 1 of FIG. 1. The parts shown include the handle 400 and its hand grip end 402, the head portion 300, head portion outer surface 301, housing wall 302, inner surface 303, pawl recess 306, pawl recess dual direction engagement ramp profiles 307, recess 309, switch bore 310 and switch arm recess 311. The drive element 200 has a circumferentially extending toothed portion 201 having teeth 202, a spigot 203, retaining flange 205, sealing ring groove 206, seal 207, flange 208, thumbwheel profile 210, retaining screws 214 and screw holes 215. The pawl 500 toothed face 501 having teeth 502, dual direction engagement ramp surfaces 503, rear face 504, flange 505, biasing face 506, first and second end stops 507, 508 and the guide face 508 between. The switch 600 with its operating lever 601, axle 602, pressing member 604 and biasing spring 607.

Figure 6:
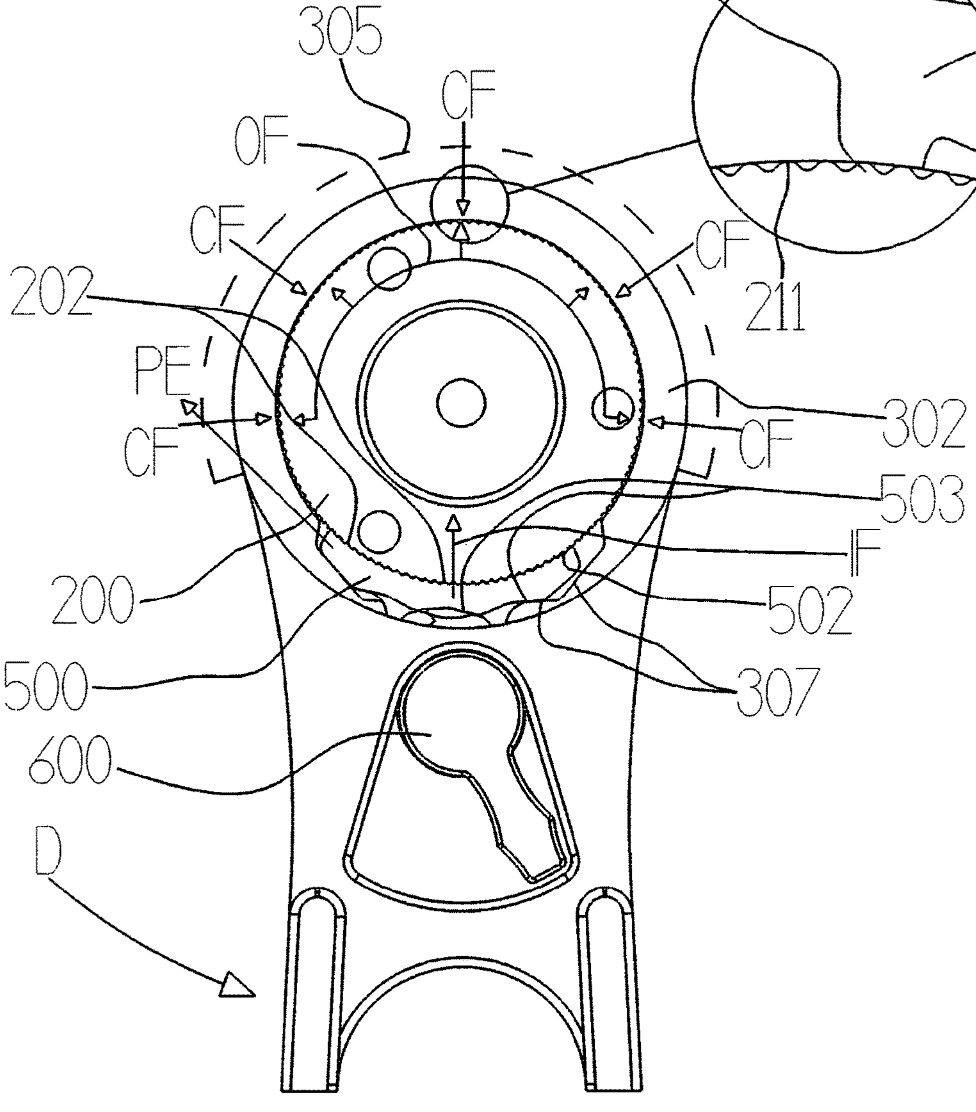
FIG. 6 is a view corresponding to FIG. 4 showing the ratchet wrench operated in the drive direction.

Referring to FIG. 6, the ratchet wrench 1, a potential width reduction of the housing wall 302 of the head portion 300 is shown. The housing wall 302 may be made from suitable spring steel in order to provide a resiliently deformable wall portion 305. When the ratchet wrench 1 is operated in the drive direction D, the pawl 500 is driven in the pawl engagement PE direction so that the pawl engagement ramp profiles 503 (FIGS. 1 and 2 versions) or 511 (FIGS. 9 and 10 version) are pressed against the pawl recess ramp surfaces 307 (FIGS. 1 and 2 versions) or 308 (FIGS. 9 and 10 version) so that the toothed face 501 of the pawl 500 is driven inwardly with respect to the drive element housing 312 against the circumferentially extending drive element toothed portion 201 to lock the drive element 200 within the head portion 300. The drive element 200 is configured so as to be capable of limited lateral movement against the inner surface 303 of the drive element housing 312 so that the drive element teeth 202 can firmly engage the inner surface 303 of the central housing 312 opposite the pawl recess 306 (see FIG. 7). When a force is applied to hand grip end 401 of the handle 400 in the drive direction D, the inward force IF exerted by the drive element 200 may deform the resiliently deformable wall portion 305 of the head portion 300 inwardly upon the toothed portion 201 of the drive element 200 resulting in a superior clamping force CF action between the drive element and the abutting portion of the housing wall 302. The teeth 202 of the drive element 200 may have substantially flat tips 211 as an aid to the clamping force CF gripping action provided between the drive element toothed portion 201 and the housing inner surface 303 of the housing resiliently deformable wall portion 305, so that the drive element 200, pawl 500 and head portion housing wall 302 form of a pseudo-laminate structure when utilized in the drive direction D. This structure provides an inherently stronger ratchet mechanism and wrench head portion size-for-size compared to prior art wrench head portions, thus permitting superior torque transmission by relatively smaller head portions 300. The pseudo-laminate like structure of the drive element 200, pawl 500 and drive element housing 312 enables the provision of a proportionately far stronger or a thinner lighter wrench head. Furthermore, the head portion 300 strength is enhanced by the fact that the main locking forces IF, CF are directed inwards onto the inherently strong circular drive element toothed portion 201. A further aid to locking engagement between the housing inner surface 303 and the drive element toothed portion 201 is obtained by the teeth 202 having tips that are radiused so as to be near flat and having the same profile as the inner surface 303 of the drive element housing 312.

Figure 8:
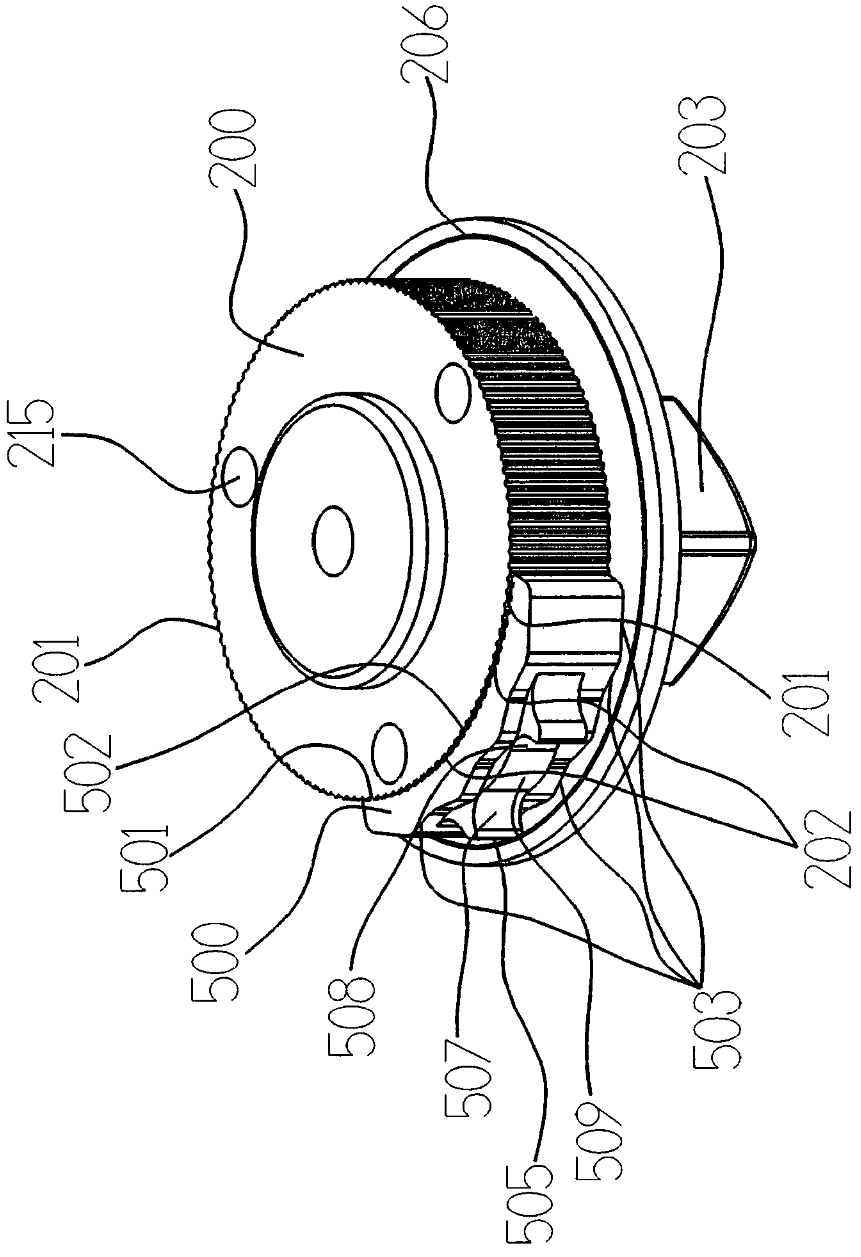
FIG. 8 is a perspective view of the drive element and pawl of the ratchet wrench of FIG. 1.

FIGS. 3, 8 and 10 show the drive element toothed portion 201 will be substantially the same height as the head portion housing wall 302. The depth, or height of the toothed face 501 of the pawl 500 is also is substantially the same as the height of the head portion housing wall 302, thereby further maximising the pawl 500 to drive element tooth 202 to pawl tooth 502 engagement contact area.

The drive element 200 is retained in the drive element housing 312 between two relatively thin flanges 205, 208 (best seen in FIG. 3). Preferably, one of the retaining flanges 205 is integral with the drive element 200. The other flange 208 is defined by a closure washer releasably secured to the drive element 200 by screws 214 that engage in screw holes 215 provided in the drive element. The configuration of the parts is such as to allow the drive element 200 to move laterally within the drive element housing 312 according to the specified tolerances. The use of screws 214 to secure the flange 208 to the drive element 200 allows it to be conveniently removed in order to access or service the ratchet mechanism.

FIG. 10 further illustrate how the flange 208 may be secured against one another by rivet upstands 212 incorporated within the drive element mating surface 216, the closure washer 208 preferably having countersunk holes 217 for the retention of the splayed rivet head 212. By incorporating the rivet fixing 212 within the drive element mating face 216 and thereby virtually obviating the chance of a separate rivet 212 or screw 214 coming loose from the drive element 200 the ratchet wrench is ideal for use in the aerospace industry as the incidence of foreign objects being left in problem areas is further reduced. The rivet protrusions 212 could be further usefully enhanced by the use of central holes 213 for the ease of precision splaying during the production process.

FIGS. 3, 8 and 10 further illustrate the ratchet wrench 1, which can be completely sealed in order to prevent harmful moisture or detritus ingress. The drive element 200 is retained in the head portion 300 between two flanges 205, 208. The flanges 205, 208 retain the drive element 200 within the drive element housing 312 whilst usefully allowing the drive element 200 to move laterally according to the allowed tolerances. The inner surface of the flanges 205, 208 may be provided with respective grooves 206, 209 near their periphery, in which an appropriate seal 207 can be located. The seals 207 usefully act against the upper and lower smooth flat housing faces 313 out with the pawl recess 306, in order to provide an efficient method of preventing detritus or moisture damaging the wrench head. A further groove 608 and seal 609 can be located within the switch axle 602 of the switch 600 in order to advantageously complete the sealing action when a switch 600 is fitted.

FIGS. 5, 6, 9 and 10 further illustrate the ratchet mechanism 1, whereas the said engagement ramp profiles 308, 511 are single toothed or shark fin like profiled in order that the ratchet action can be utilized in only one direction whereas no switch 600 function is required. Furthermore when the present invention is utilized as a un-switched or single direction ratchet the pawl 510 can be resiliently urged into pawl engagement PE between the said pawl 510 and the drive element teeth 202 by a low cost torsion type spring 515 positionally retained by a suitable pin 518, one end of the said spring 518 resiliently acting against the undercut sidewall 309, the opposing end of the said spring usefully resiliently acting against the pawl rear protrusion 513 biasing face 514. In the reverse or reposition direction R the said pawl 510 is propelled in the pawl disengagement direction PD whereas the drive element teeth 202 can resiliently slide over the said pawl 510 teeth 502.

The invention claimed is:

1. A ratchet wrench comprising:

a handle having a head end;

a head portion connected to said head end and provided with a circular drive element housing having a circular drive element wall, said head portion having a pawl recess disposed between said drive element housing and said head end and opening into said drive element housing at said circular drive element wall;

a drive element at least partially housed in said drive element housing and having a toothed portion comprising teeth disposed circumferentially about said drive element, said drive element having an axis of rotation, said drive element and said circular drive element wall being configured so that said drive element can move laterally in said drive element housing away from said pawl recess to engage said circular drive element wall opposite said pawl recess; and a pawl located within the pawl recess, the pawl having a plurality of engagement ramp profiles configured to engage respective ramp surfaces provided in said pawl recess and a toothed face facing into said housing and provided with a plurality of teeth configured to mesh with oppositely disposed teeth of said drive element toothed portion, wherein the arrangement is such that, in use, when a drive force is applied to said handle, a plurality of said engagement ramp profiles engage with the respective ramp surfaces to urge the pawl into locking engagement with the drive element, and wherein said circular drive element wall is partially defined by an arcuate wall portion that is configured to resiliently deform when, in use, said pawl lockingly engages said drive element causing said drive element to move laterally in said drive element housing to engage said circular drive element wall opposite said pawl recess, whereby said resilient deformation causes said circular drive element wall to clamp upon the drive element.

2. The ratchet wrench claimed in claim 1, wherein said engagement ramp profiles comprise a first set of engagement ramp profiles inclined in a first direction for engagement with the respective ramp surfaces when, in use, the head portion is rotated in a first direction and a second set of engagement ramp profiles inclined in a second direction for engagement with the respective said ramp surfaces when, in use, the head portion is rotated in a second direction that is opposite to said first direction.

3. The ratchet wrench claimed in claim 1, wherein the said engagement ramp profiles are inclined in one direction so as to be uni-directional whereby the engagement ramp profiles engage the respective ramp surfaces to urge the pawl into locking engagement with said drive element when, in use, said head portion is rotated in first direction but not when said head portion is rotated in a second direction that is opposite to said first direction.

4. The ratchet wrench claimed in 1, wherein when said pawl lockingly engages said drive element, said toothed face engages said toothed portion of the drive element over a subtended angle in the range 40 to 80 degrees.

5. The ratchet wrench claimed in claim 1, wherein the head portion has a height, the drive element housing has a height at least substantially equal to the height of the head portion, the teeth of the drive element toothed portion have a height at least substantially equal to the height of said drive element housing and the teeth of the pawl have a height at least substantially corresponding to the height of the teeth of the drive element.

6. The ratchet wrench claimed in claim 1, wherein said drive element teeth have respective radiused tips having a curvature at least substantially corresponding to a curvature of the circular drive element housing.

7. The ratchet wrench claimed in claim 1, wherein opposite ends of said drive element are provided respective flanges and said head portion is held between said flanges.

8. The ratchet wrench claimed in claim 7, wherein one said flange is defined by an annular member secured in abutting relationship with a plurality of rivet upstands that are integral with the drive element, the annular member having respective countersunk holes to receive heads of respective rivets engaged in said rivet upstands.

9. The ratchet wrench claimed in claim 7, wherein at least one of said flanges is configured as a thumb wheel to enable rotation of said drive element by a user.

10. The ratchet wrench claimed in claim 7, further comprising respective sealing members disposed between the flanges and the drive element.

11. The ratchet wrench claimed in claim 1, wherein said pawl is biased into engagement with said drive element by a torsion spring secured to said head portion.

12. The ratchet wrench claimed in claim 1, wherein said engagement ramp profiles and the respective ramp surfaces are configured such that they cannot completely disengage when, in use, the head portion is rotated in a reverse direction in which said pawl teeth slide over said toothed portion of the drive element.

13. The ratchet wrench claimed in claim 1, wherein when, in use, said pawl is in locking engagement with the drive element, said drive element, pawl and circular drive element wall engage so as to form of a pseudo-laminate structure.

14. A ratchet wrench comprising:

a handle;

a wrench head housing a drive element; and a pawl engageable with teeth provided on said drive element to lock said drive element to said wrench head to permit a torque input to said handle to be transferred to said wrench head, wherein said wrench head comprises an external wall that defines a first recess in which said drive element is received and a second recess in which said pawl is received and said external wall comprises a C-shaped wall portion that extends about said drive element and is configured to deform when, in use, said pawl locks lockingly engages said drive element causing said drive element to move laterally in said first recess to engage said C-shaped wall portion opposite said second recess, whereby said resilient deformation causes said C-shaped wall to clamp upon the drive element, wherein the pawl has a center line and a plurality of engagement ramp profiles and said wrench head has respective ramp surfaces engageable with said engagement ramp profiles, said plurality of engagement ramp profiles comprising at least one first engagement ramp profile disposed on one side of said center line and at least one second engagement ramp profile disposed on a second side of said center line, and wherein said engagement ramp profiles and ramp surfaces are configured so that, in use, a plurality of said plurality of engagement ramp profiles simultaneously engage the respective ramp surfaces so that at least one first engagement ramp profile and at least one second engagement ramp profile are simultaneously engaged by said respective ramp surfaces.

15. A ratchet wrench as claimed in claim 14, wherein said drive element has a circumference and said ramp surfaces are inclined in a circumferential direction of said drive element.

16. A ratchet wrench as claimed in claim 15, wherein adjacent said ramp surfaces are inclined so as to be at an angle of less than ninety degrees to one another.

17. A ratchet wrench comprising:

a handle;

a wrench head housing a drive element; and a pawl engageable with teeth provided on said drive element to lock said drive element to said wrench head to permit a torque input to said handle to be transferred to said wrench head, wherein said wrench head comprises an external wall that defines a first recess in which said drive element is received and a second recess in which said pawl is received and said external wall comprises a C-shaped wall portion that extends about said drive element and is configured to deform when, in use, said pawl lockingly engages said drive element causing said drive element to move laterally in said first recess to engage said C-shaped wall portion opposite said second recess, whereby to said wrench head and said resilient deformation causes said C-shaped wall to clamp upon the drive element, wherein the pawl has a plurality of engagement ramp profiles and said wrench head has respective ramp surfaces engageable with said engagement ramp profiles, and wherein, in use, a plurality of said plurality of engagement ramp profiles simultaneously engage the respective ramp surfaces.

18. A ratchet wrench as claimed in claim 17, wherein said drive element has a circumference and said ramp surfaces are inclined in a circumferential direction of said drive element, and wherein adjacent said ramp surfaces are inclined so as to be at an angle of less than ninety degrees to one another.

* * * * *